United States Patent
Palanisamy

(10) Patent No.: US 12,074,974 B2
(45) Date of Patent: Aug. 27, 2024

(54) METHOD AND SYSTEM FOR ACCESS TOKEN PROCESSING

(71) Applicant: Visa International Service Association, San Francisco, CA (US)

(72) Inventor: Karthikeyan Palanisamy, Singapore (SG)

(73) Assignee: Visa International Service Association, San Francisco, CA (US)

( * ) Notice: Subject to any disclaimer, the term of this patent is extended or adjusted under 35 U.S.C. 154(b) by 799 days.

(21) Appl. No.: 16/415,360

(22) Filed: May 17, 2019

(65) Prior Publication Data
US 2019/0356489 A1    Nov. 21, 2019

Related U.S. Application Data

(60) Provisional application No. 62/673,453, filed on May 18, 2018.

(51) Int. Cl.
*H04L 9/32* (2006.01)
*H04L 9/40* (2022.01)

(52) U.S. Cl.
CPC ........ *H04L 9/3213* (2013.01); *H04L 63/0876* (2013.01); *H04L 63/0884* (2013.01)

(58) Field of Classification Search
CPC ............... H04L 9/3213; H04L 63/0876; H04L 63/0884; H04L 2209/56; H04L 63/10; H04L 63/0823
See application file for complete search history.

(56) References Cited

U.S. PATENT DOCUMENTS

| | | | | |
|---|---|---|---|---|
| 2005/0097079 | A1* | 5/2005 | Machida | G06F 16/955 707/E17.112 |
| 2015/0199679 | A1* | 7/2015 | Palanisamy | H04L 63/0884 705/67 |
| 2015/0312038 | A1* | 10/2015 | Palanisamy | G06Q 20/385 713/155 |

* cited by examiner

*Primary Examiner* — Jeffrey D. Popham
(74) *Attorney, Agent, or Firm* — Kilpatrick Townsend & Stockton LLP

(57) ABSTRACT

A method is disclosed and includes receiving a token request message in response to a user interaction of a first user. The method also comprises obtaining a token in response to receiving the token request message; transmitting the token to a resource provider, where the resource provider stores the token, provides a notification to a user communication device of a second user, receives a response to the notification, and then transmits an authorization request message comprising the token. The method also includes receiving the authorization request message comprising the token, detokenizing the token to a real credential, and transmitting a modified authorization request including the real credential to an authorizing entity computer for authorization.

12 Claims, 5 Drawing Sheets

METHOD AND SYSTEM FOR ACCESS TOKEN PROCESSING

CROSS-REFERENCE TO RELATED APPLICATIONS

This application is a non-provisional application of U.S. provisional application No. 62/673,453, filed on May 18, 2018, which is herein incorporated by reference in its entirety for all purposes.

BACKGROUND

There can be a number of instances in which a first user may wish to grant access to a resource like secure data, a secure location, or goods and services, to a second user. In such situations, a user could simply provide an access credential such a password to a second user. The second user can then use the secure credential to access the resource at a resource provider. However, the passage of the access credential from the first user to the second user through a medium such as the Internet is problematic, since the passage of such credentials can be subject to man-in-the-middle attacks. Further, conventional methods and systems for providing access to a second user in response to a request from a first user are infrastructure and resource intensive.

Embodiments address these as well as other problems, individually and collectively.

SUMMARY

Embodiments of the invention include secure token processing systems and methods.

One embodiment of the invention is directed to a method comprising, receiving, by a processing server computer, a token request message in response to a user interaction of a first user; obtaining, by the processing server computer, a token in response to receiving the token request message; transmitting, by the processing server computer, the token to a resource provider computer, wherein the resource provider computer stores the token, provides a notification to a communication device of a second user, receives a response to the notification, and then transmits an authorization request message comprising the token to the processing server computer; receiving the authorization request message comprising the token; initiating detokenizing the token to a real credential; and transmitting a modified authorization request including the real credential to an authorizing entity computer for authorization.

Another embodiment of the invention includes a processing server computer comprising: a processor; and a computer readable medium coupled to the processor, the computer readable medium comprising code, executable by the processor, to implement a method comprising: receiving a token request message in response to a user interaction of a first user; obtaining a token in response to receiving the token request message; transmitting the token to a resource provider computer, wherein the resource provider computer stores the token, provides a notification to a communication device of a second user, receives a response to the notification, and then transmits an authorization request message comprising the token to the processing server computer; receiving the authorization request message comprising the token; initiating detokenizing the token to a real credential; and transmitting a modified authorization request including the real credential to an authorizing entity computer for authorization.

Another embodiment of the invention includes a method comprising: receiving, by an authorizing entity computer, a selection from a communication device, of a request for a token for a resource provider associated with a resource provider computer; transmitting, by the authorizing entity computer, a token request message to a processing server computer, which then obtains the token and transmits the token to a resource provider computer; receiving, by the authorizing entity computer, an authorization request message from the resource provider computer comprising the token; and transmitting, by the authorizing entity computer, an authorization response message to the resource provider computer.

These and other embodiments of the invention are described in further detail below.

DETAILED DESCRIPTION

Figure 1:
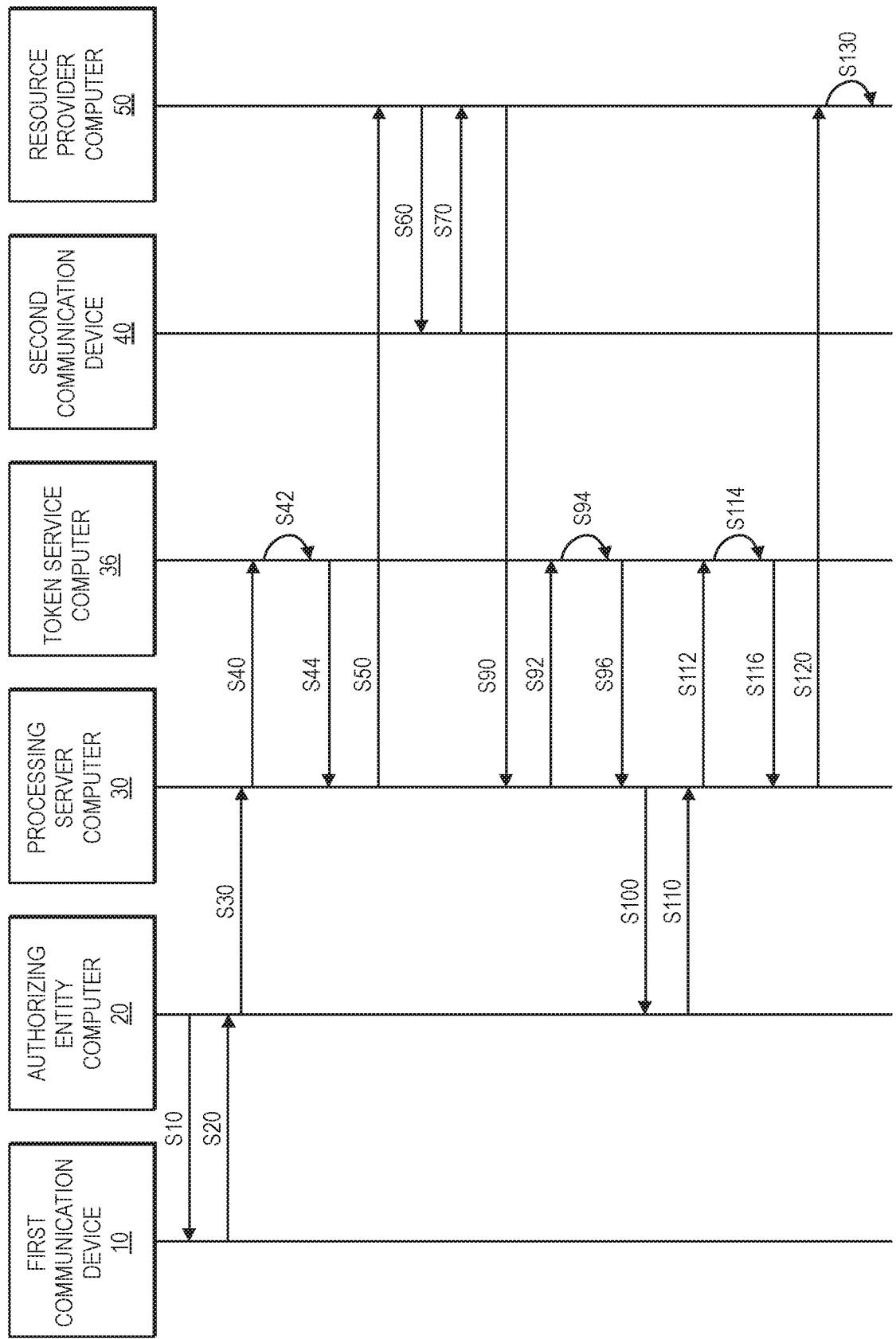
FIG. 1 shows a block diagram of a system along with a process flow according to an embodiment.

Embodiments of the present invention may include the ability to provide a token which was initiated by a sender and which can be temporarily stored by a resource provider, for later use at the resource provider by a recipient. In some embodiments, the recipient may be a user that receives a gift or other value from the sender, where the gift or other value is used at the resource provider by the recipient to make a purchase of some good or resource at the resource provider. This can be useful, since the time when a recipient can redeem a gift can vary. It is not desirable to charge the sender's account before it is necessary to do so, and embodiments of the invention address this problem as well. Also, by providing a token to the resource provider, the sender's (e.g., gift giver's) real credentials cannot be compromised at the resource provider. In other embodiments, the recipient may be a user that can access secure data at a resource provider, using a token stored at the resource provider.

Before discussing embodiments of the invention, some descriptions of some terms may be useful.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," token provider" or "token service computer" can include a system that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the tokens to obtain the actual PANs. In some embodiments, a token service computer may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token request message" may be an electronic message for requesting a token. A token request message may include information usable for identifying an account such as a payment account or digital wallet, and/or information for generating a token such as a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

Other information that can in be token request and response messages are provided in the description below.

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc. A resource provider may operate a "resource provider computer," which may be an access device, a backend server, a frontend server, a Web server, an application server, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to something. An access device may be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), Web servers, kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a system including a first user communication device 10 operated by a first user (e.g., a sender), an authorizing entity computer 20, and a processing server computer 30 in communication with each other. The system may also include a token service computer 36, which can be in communication with the processing server computer 30. The system may also comprise a second communication device 40 operated by a second user (e.g., a recipient), which can be in communication with a resource provider computer 50. The resource provider computer 50 may be in communication with the processing server computer 30.

In some embodiments, the processing server computer 30 may coordinate the functions of routing, generating, and formatting messages to facilitate embodiments. In other embodiments, the processing server computer 30 may be in a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet. In some embodiments, the token service computer 36 may be in the processing server computer 30.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

A method according an embodiment can be described with reference to FIG. 1. A method may include the delivery of an access token such as a payment token for use in a process of a first user providing a gift to a second user, where the gift can be used at a particular resource provider associated with a specific resource provider computer. However, it is understood that embodiments of the invention are not limited to this. For example, embodiments of the invention can be used to allow a first user to provide a second user with access to a secure location or secure data via a resource provider.

Referring to FIG. 1, in step S10, a first user such as a cardholder can access their issuer online web/mobile application associated with the authorizing entity computer 20 using the first user communication device 10. The application on the communication device 10 may communicate with the authorizing entity computer 20 via an API (application programming interface) or a browser. Once the first user has authenticated himself or herself to the application and the authorizing entity computer 20, the first user may view any accounts that are held by the authorizing entity computer 20. The accounts may be identified by their associated account identifiers, and may include credit, debit, or prepaid accounts. The application may also show any tokens that were previously generated at the request of the user. The tokens may or may not be associated with specific resource providers. For example, a first user may have a credit card account and a debit card account at the authorizing entity associated with the authorizing entity computer 20. The application may also show that the debit card account has a generic payment token associated with the debit card account that can be used at any resource provider. The application may also show the credit card account as having merchant specific tokens generated for specific recipients for specific resource providers. For example, a credit card account of the first user may have been used to generate a first token having an associated value of $50 for user A for use at merchant X, and a second token having an associated value of $100 for user B for use at merchant Y.

Continuing with the process flow in FIG. 1, once the first communication device 10 is in communication with the authorizing entity computer 20, in addition to being able to view the status of his or her accounts, the first user (e.g., cardholder) can see the list of merchants who are offering online gift cards, and also associated rewards or promotions. For example, the first user may see a list of merchants including merchants X and Y, where a gift card denomination of $50, $100, or $200 may be purchased for a recipient.

In step S20, the first user wishes to send an electronic gift to a second user (i.e., a recipient), where the electronic gift is used at a specific merchant (e.g., merchant X). The user selects the desired merchant displayed on the first communication device 10, and inputs a desired denomination (e.g., $100) and an account to charge (e.g., the first user's credit card account). The first user may also input a second communication device identifier for a second communication device of a second user, or other suitable identifier of the second user. Examples of communication device identifiers include phone numbers, e-mail addresses, public keys, URLs, etc. The first user may further input other information into the first communication device. For example, the other information may include, but is not limited to recipient information (e.g., a name, email, phone, custom message, etc.), and any limitations on the use of the gift (e.g., the gift can only be used for groceries or a specific product at merchant X). The authorizing entity computer 20 may receive any of the above-noted information to facilitate the generation and subsequent use of a payment token.

In step S30, after the authorizing entity computer 20 receives the information including the selected account to charge, the information regarding the second user (e.g., the second user's second communication device information, any message to the second user), the amount of the gift, the specific merchant for which the gift is to be used, and any limitations on the gift, the authorizing entity computer 20 may transmit a request message such as a token request message to the processing server computer 30. The specific merchant may be identified by a specific merchant identifier, which may be a specific code, a URL, a name, etc. Thus, the request message may indicate the first user's intent to create a token with specific limitations (e.g., a specific amount and for use at a specific merchant) and may include recipient details (e.g., name, e-mail, etc.).

In some embodiments, the authorizing entity computer 20 may place a hold on the selected account to charge in the amount of the gift. For example, if the gift is for $100 and the selected account has a credit limit of $100, then a hold of $100 may be placed on the account such that the available spending limit on the selected account is decreased to $900.

In step S40, after receiving the request message such as a token request message, the processing network computer 30 stores the information in the request message from the authorizing entity computer 20, and then obtains a token. In some embodiments, it generates a token request message, or forwards the token request message provided by the authorizing entity computer 20, and sends it to the token service computer 30. The token request message may request a token from the token service computer 30, and may include information including the identifier (e.g., a PAN) for the account to be tokenized, and in some embodiments, the particular environment/circumstances in which the requested token is to be used (e.g., at a specific merchant and/or during a specific time period).

At step S42, the token service computer 30 then obtains the token, and optionally any token cryptogram that may accompany the token. The token cryptogram may be used to restrict the use of the token to a particular payment channel or environment. For example, in some embodiments, a token may be used in an in person payment transaction, but will not be valid unless it is accompanied by a specific cryptogram. The token may also be used in an e-commerce payment transaction, but needs to be accompanied by a different cryptogram before it can be used for the e-commerce payment.

The token service computer 30 may obtain the token in any suitable manner. In some embodiments, tokens may be pre-generated by the token service computer 30 and stored until a request for a token is received. Once received, the account identifier may be stored in a database at the token service computer 30 along with the token that will be associated with the account identifier. In other embodiments, the token may be generated after receiving the request for the token. The token may or may not be mathematically derived from the account identifier. In either case, the token and the account identifier, and any cryptogram (as well as any restrictions associated with the cryptogram) may be stored in a database at the token service computer 30, or even at the processing server computer 30. Other information that may reside in the database in the processing server computer 30 may also include a balances or limitations associated with the token.

In step S44, the token service computer 36 then provides the token and any optional cryptogram to the processing server computer 30.

In step S50, after receiving the token from the processing server computer 30, the processing server computer 30 provides details of the gift that was requested by the first user, and the token and optional cryptogram, to the resource provider computer 50 associated with the resource provider (i.e., the merchant). In this regard, the processing server computer 30 may receive an address (e.g., a URL, IP address, etc.) for the resource provider computer 50 from the processing server computer 30. The details may include the amount of the gift, and any associated restrictions on the gift.

In some embodiments, after the resource provider computer 50 receives the details regarding the gift and the token, the resource provider computer 50 can deliver the token to the recipient through their own channel to activate/redeem the gift (e.g., in steps S60 and S70). In some embodiments, the limitations on the gift are also received, stored, and enforced by the resource provider computer 50. For example, a limitation that the gift can only be used with groceries sold by the resource provider may be stored at and enforced by the resource provider computer 50.

In other embodiments, the token is not delivered to the second communication device 40 of the second user (e.g., the recipient). Rather, in step 60, a notification (without a token) that a gift was sent to the second user (e.g., the recipient) by the first user (e.g., the sender) is delivered to the second user's second communication device 40. More specifically, the resource provider computer 50 can communicate with the second user (e.g., the gift card recipient) that may operate the second communication device 40 through an available channel (email/SMS) and deliver the gift card for redemption.

In step S70, the user of the second communication device 40 provides a request to redeem the gift card (and hence use the token stored at the resource provider) to the resource provider computer 50. For example, the resource provider computer 50 may operate a Website, which offers clothing for sale. The second user may use the second communication device 40 and may select shoes to purchase using the gift card. At that point, the resource provider computer 50 may check to see if the purchase of the shoes is inconsistent with any limitations on the use of the token. Further, prior to allowing the second user of the second communication device to use the gift card and/or the token to obtain the resource at the resource provider, the second user may be required to authenticate themselves at the resource provider. Any suitable means for authentication may be used including a shared passcode, one time password, or device ID.

In step S90, if there are no such restrictions, the resource provider computer 50 may generate and transmit an authorization request message including the token to the processing server computer 30 (e.g., via a transport computer such as an acquirer computer—not shown). The authorization request message may include information including the token, an optional cryptogram, a transaction amount, a transaction channel indicator, etc.

At step S92, after the processing server computer 30 receives the authorization request message, it can initiate a de-tokenization process. In some embodiments, the processing server computer 30 can transmit the token and the optional cryptogram and transaction channel indicator (or domain or token presentment mode indicator) in a detokenization request to the token service computer 36.

At step S94, after receiving the token, the token service computer 36 can de-tokenize the token to a real credential such as the cardholder's primary account number. The token server computer 36 may look up the account number corresponding to the token that was received in a database. In some embodiments, the token server computer 36 or the processing server computer 30 may verify that the cryptogram is associated with the transaction channel indicator received in the de-tokenization request message.

In step S94, the token service computer 36 can transmit the real credential to processing server computer 30 in a de-tokenization response message.

In step S100, a modified authorization request message may be generated by the processing server computer 30 by replacing the token with the real credential. The modified authorization request message is then transmitted to the authorizing entity computer 20. The authorizing entity computer 20 can then approve or decline the transaction based upon the real credential. The authorizing entity computer 20 can determine if the transaction is authorized or not, depending upon whether or not the account associated with the real credential has sufficient funds or credit to pay for the transaction. The authorizing entity computer 20 may also perform a number of fraud or security checks on the transaction before approving of it.

In some embodiments, the processing server computer 30 and/or the authorizing entity computer 20 may store and enforce any limitations on the token that may have been specified by the first user of the first communication device 10. For example, the processing server computer 30 and/or the authorizing entity computer 20 may store a limitation that a transaction involving the token may not exceed $100. If the authorization request message that included the token includes a transaction amount that exceeds $100, then the processing server computer 30 and/or the authorizing entity computer 20 may transmit an authorization response message back to the resource provider computer 50 declining the transaction.

In step S110, the authorizing entity computer 20 can transmit an authorization response message to the processing server computer 30. The authorization response message may comprise a real credential and an indication of whether or not the transaction is approved to the processing server computer 30.

In step S112, the processing server computer 30 may transmit the real credential to the token service computer 36 in a re-tokenization request message.

In step S114, after receiving the re-tokenization request message including the real account identifier, the token service computer 36 can re-tokenize the real credential to obtain the token associated with the real credential.

In step S116, the token server computer 36 can then transmit the token to the processing server computer 30 in a re-tokenization response message.

In step S120, the processing server computer 30 may then generate a modified authorization response message to substitute the real credential with the token, and may then transmit it back to the resource provider computer 50.

In step S130, the resource provider computer 50 can store the data in the modified authorization response message. If the amount of the transaction is less than the amount of the gift, then the remaining balance may be saved as a credit to the second user in the resource provider computer 50. Any unused portion of the gift may be present as a credit at the resource provider computer 50 which may be used by the second user at a future date. If the entire amount of the gift was used, then the token may be automatically deleted from the resource provider computer 50 to prevent future use of the token.

In some embodiments, if the amount of the purchase at the resource provider computer 50 is less than the amount of the gift associated with the token, then the resource provider computer 50 could request that the second user enter another credential to pay for the remaining balance. The other credential may be a credit card or debit card number, which is used to process the balance of the transaction as in a conventional credit or debit card payment process.

Once approval has been received by the resource provider computer 50, any resource (e.g., goods, services, secure location, data) requested by the second user of the second communication device 40 may be provided to the second user.

At the end of the day or at any other suitable period of time, a clearing and settlement process can take place between the processing server computer 30, the authorizing entity computer 20, and a transport computer (not shown) of an acquirer that manages an account of the resource provider 50 operating the resource provider computer. The amount of the gift is transferred from the authorizing entity computer 20 to the transport computer of an acquirer associated with the resource provider computer.

Figure 2:
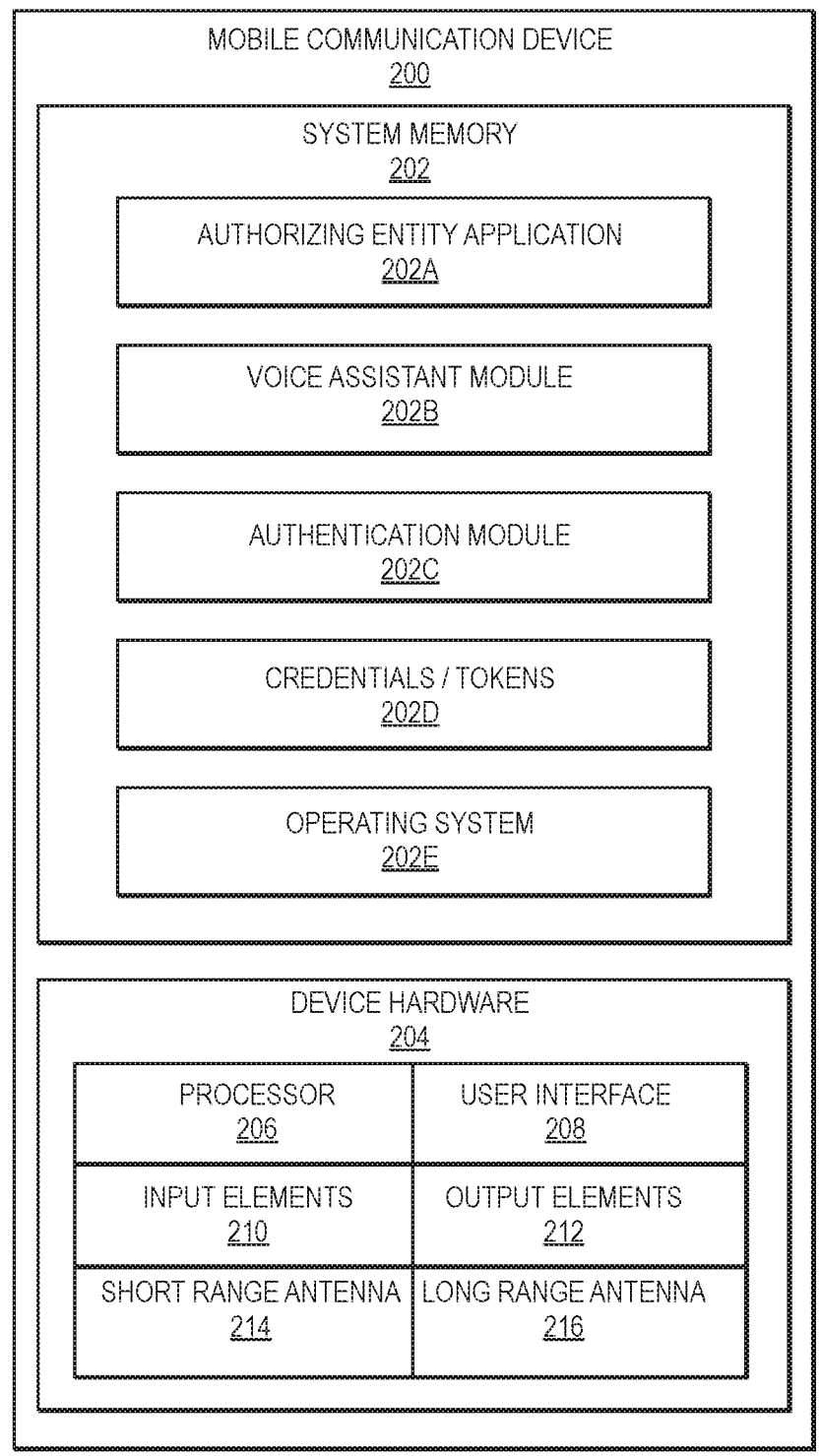
FIG. 2 shows a diagram of a mobile communication device according to an embodiment.

FIG. 2 illustrates a mobile communication device 200 according to an embodiment. Mobile communication device 200 may include device hardware 204 coupled to a system memory 202. The features of the mobile communication device 200 may be in the first or second communication devices 10, 40 in FIG. 1.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors, etc. Examples of output elements may include speakers, display screens, and tactile devices. The processor 206 can be implemented as one or more integrated circuits (e.g., one or more single core or multicore microprocessors and/or microcontrollers), and is used to control the operation of mobile communication device 200. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by mobile communication device 200 to communicate with other devices and/or to connect with external networks. The user interface 208 can include any combination of input and output elements to allow a user to interact with and invoke the functionalities of mobile communication device 200. The short range antenna 214 may be configured to communicate with external entities through a short range communication medium (e.g. using Bluetooth, Wi-Fi, infrared, NFC, etc.). The long range antenna 216 may be configured to communicate with a remote base station and a remote cellular or data network, over the air.

The system memory 202 can be implemented using any combination of any number of non-volatile memories (e.g., flash memory) and volatile memories (e.g. DRAM, SRAM), or any other non-transitory storage medium, or a combination thereof media. The system memory 202 may store computer code, executable by the processor 206, for performing any of the functions described herein.

The system memory 202 may also store an authorizing entity application 202A, a voice assistant module 202B, an authentication module 202C, credentials 202D, and an operating system 202E. The authorizing entity application 202A may include instructions or code initiating and conducting a transaction with an external device such as an authorizing entity computer, an access device or a processing computer. It may also allow a person to manage accounts at an authorizing entity. Examples of authorizing entity applications include banking applications, digital wallet applications, transit agency applications, secure data access applications, etc. The voice assistant module 202B may comprise code, executable by the processor 206, to receive voice segments, and generate and analyze data corresponding to the voice segments. An example of a voice assistant module 202B may include Siri™, Google Assistant™, or Cortana™. The authentication module 202C may comprise code, executable by the processor 206, to authenticate a user. This can be performed using user secrets (e.g., passwords) or user biometrics.

System memory 202 may also store credentials and/or tokens 202D. Credentials may also include information identifying the mobile communication device 200 and/or the user of the mobile communication device 200. Examples of credentials may include a public key associated with the mobile communication device 200 and/or a user of the mobile communication device 200, a digital signature (e.g., the public key of the mobile communication device 200 signed by a key of the authentication system), payment credentials, biometric data (e.g., biometric samples or templates), etc.

Figure 3:
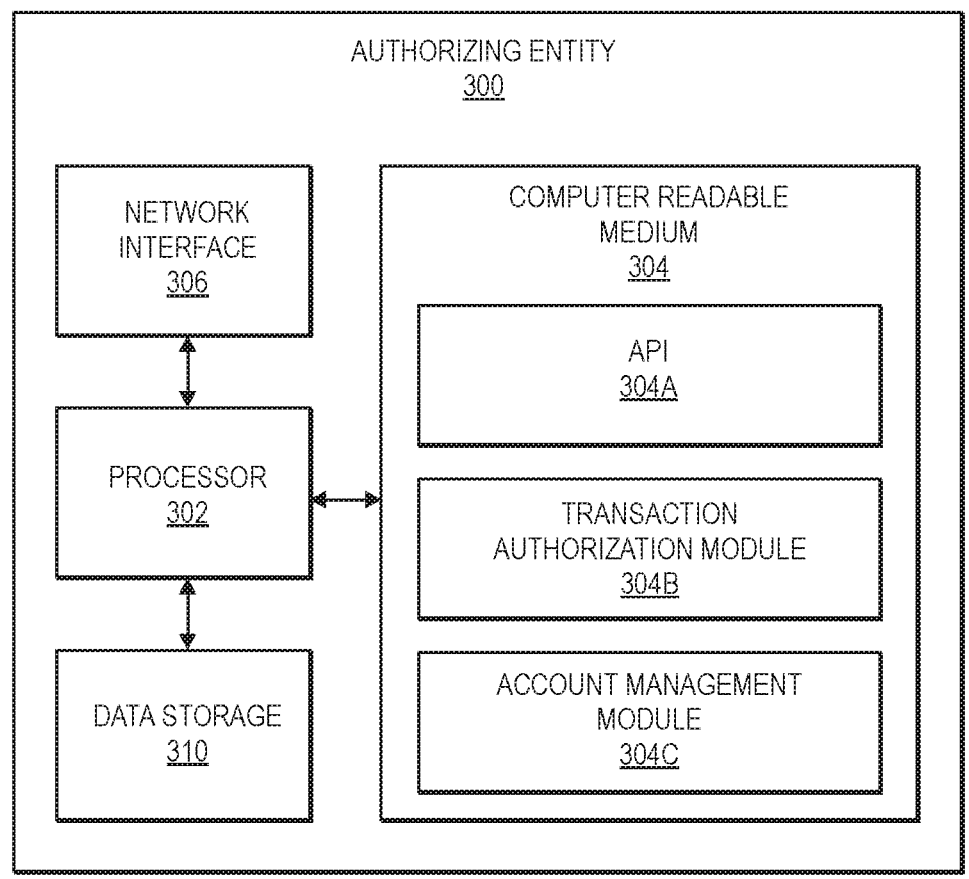
FIG. 3 shows a block diagram of an authorizing entity computer according to an embodiment.

FIG. 3 shows a block diagram showing components in an exemplary authorizing entity computer 300. The authorizing entity computer 300 may comprise a processor 302. R may also comprise a computer readable medium 304, a data storage 310, and a network interface 306. Network interface 306 may be any suitable combination of hardware and software that enables data to be transferred to and from the authorizing entity computer 300. Network interfaces may include a modem, a physical network interface (such as an Ethernet card or other Network Interface Card (NIC)), a virtual network interface, a communications port, a Personal Computer Memory Card International Association (PCM-CIA) slot and card, or the like.

The computer readable medium 304 may store code or instructions for allowing authorizing entity computer 300 to operate in the manner described herein. The instructions may be executed by the processor 302. In some embodiments, the computer readable medium 304 may include code, executable by the processor 302 for performing a method including receiving, by an authorizing entity computer, a selection from a communication device, of a request for a token for a resource provider associated with a resource provider computer; transmitting, by the authorizing entity computer, a token request message to a processing server computer, which then obtains the token and transmits the token to a resource provider computer; receiving, by the authorizing entity computer, an authorization request message from the resource provider computer comprising the token; and transmitting, by the authorizing entity computer, an authorization response message to the resource provider computer.

The computer readable medium 404 may further comprises an API module 304A, an API module 404A, a transaction authorization nodule 3046, and an account management module 304C. The API module 304A may include APIs that can connect to entities such as applications on communication devices, as well as the processing server computer 30. The transaction authorization module 304C may include code for deciding whether or not to authorize transactions.

The data storage 310 may store a database of user account data, as well as balances associated with those user accounts. Account holds, as described above, may also be present in the database. The database may be a conventional, fault tolerant, relational, scalable, secure database such as those commercially available from Oracle™ or Sybase™.

Figure 4:
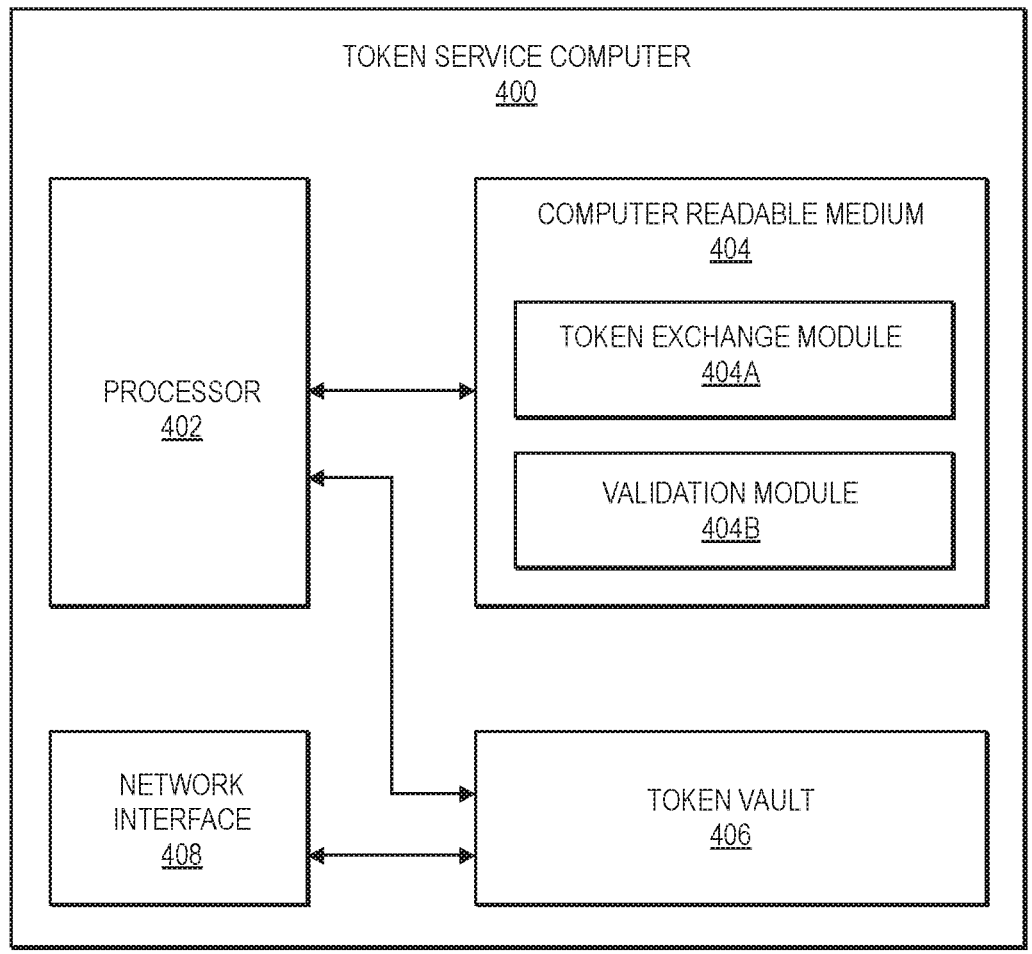
FIG. 4 shows a block diagram of a token service computer according to an embodiment.

FIG. 4 shows a token service computer 400. The token service computer 400 includes a processor 402 and a computer readable medium 404, a token vault 406, and a network interface 408 coupled to the processor 402.

The computer readable medium 404 may comprise a token exchange module 404A and a validation module 404B.

The token vault 406 may store tokens and their associated credentials in a database. As noted above, the database may also include cryptograms associated with the tokens, as well as any limitations on the use of such tokens or balances associated with the tokens. The token vault 406 may store data in a database such as an Oracle™ database.

The tokenization exchange module 404A may comprise code that causes the processor 402 to provide access tokens in response to the receipt of real credentials, or provide real credentials in response to the receipt of access tokens. For example, the token exchange module 404A may contain logic that causes the processor 402 to generate a payment token and/or associate the payment token with a set of payment credentials. A token record may then be stored in a token record database indicating that the payment token is associated with a certain user or a certain set of payment credentials.

The validation module 404B may comprise code that causes the processor 402 to validate token requests before a payment token is provided. For example, validation module 404B may contain logic that causes the processor 402 to confirm that a token request message is authentic by decrypting a cryptogram included in the message, by confirming that the payment credentials are authentic and associated with the requesting device, and by assessing risk associated with the requesting device.

Figure 5:
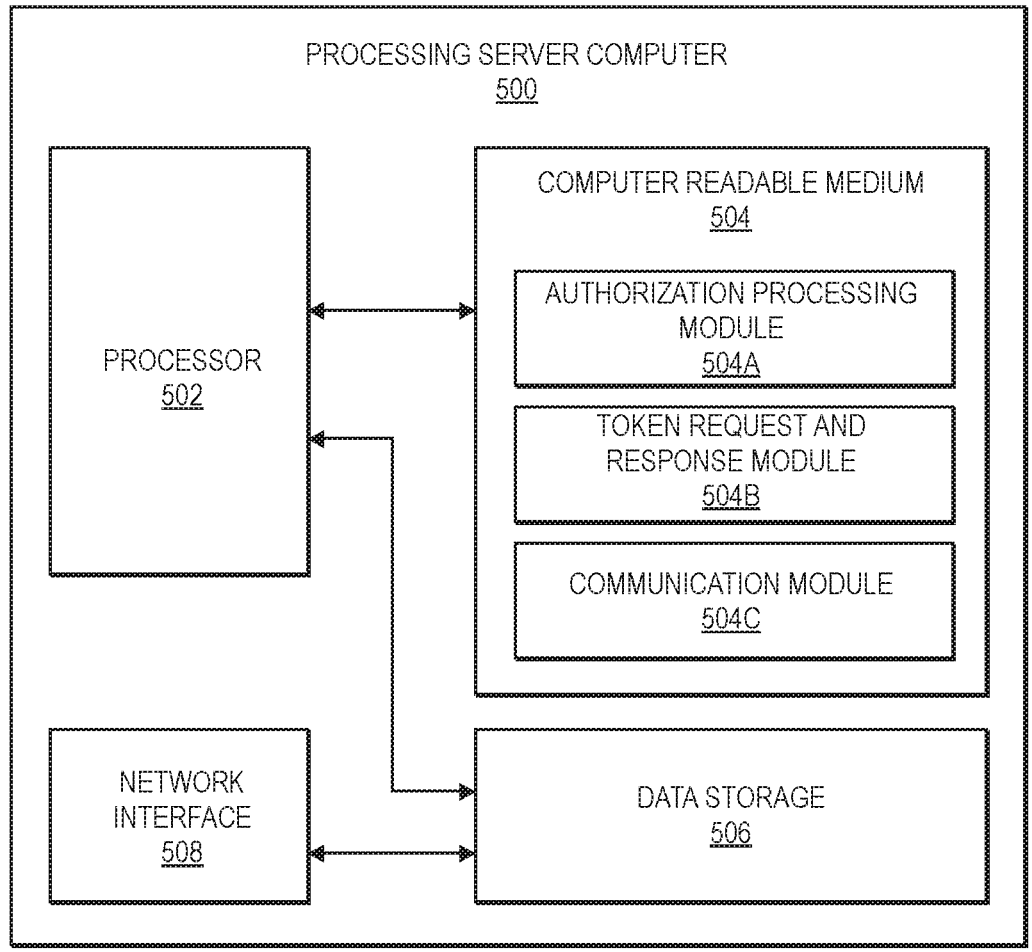
FIG. 5 shows a block diagram of a processing computer according to an embodiment.

FIG. 5 shows a block diagram of a processing computer 108 according to an embodiment. The processing computer 500 may comprise a processor 502, which may be coupled to a computer readable medium 504, data storage 506, and a network interface 508. The data storage 506 may contain access data such as tokens and/or account data, as well as mappings between access data, credentials, and/or communication device identifiers such as phone numbers, IP addresses, device identifiers, etc.

The computer readable medium 504 may comprise code, executable by a processor 502 for implementing a method comprising receiving a token request message in response to a user interaction of a first user; obtaining a token in response to receiving the token request message; transmitting the token to a resource provider computer, wherein the resource provider computer stores the token, provides a notification to a communication device of a second user, receives a response to the notification, and then transmits an authorization request message comprising the token to the processing server computer; receiving the authorization request message comprising the token; initiating detokenizing the token to a real credential; and transmitting a modified authorization request including the real credential to an authorizing entity computer for authorization.

The computer readable medium 504 may comprise a number of software modules including an authorization processing module 504A, an encryption module 504B, and a communication module 504C. The computer readable medium may also comprise a clearing and settlement module (not shown).

The authorization processing module 504A may comprise code that can cause the processor 502 to evaluate authorization request messages for transactions and determine if the transactions should be authorized. In some embodiments, transactions may or may not be authorized depending upon if they satisfy limitations associated with the tokens used to conduct the transactions. The authorization processing module 504A may also include code for routing or modifying authorization request and response messages as they pass between various parties such as authorizing entity computers (e.g., issuer computers) and transport computers (e.g., acquirer computers).

The token request and response module 504B may include code for generating requests for tokenization, de-tokenization or re-tokenization, or receiving responses to the same. It may also include code for allowing the processing computer 500 to interact with any suitable external entity to process tokens.

The communication module 504C may comprise code that causes the processor 502 to generate messages, forward messages, reformat messages, and/or otherwise communicate with other entities.

Embodiments of the invention have a number of technical advantages. For example, since an actual real credential is never received by a resource provider (e.g., a merchant) or a recipient (a second user) of something provided by a sender (a first user), the real credential is protected from possible man-in-the-middle attacks. Further, even though a token has issued, any value associated with that token is not withdrawn from an account of a sender until actual redemption of that token. As a result, there can be no wasted resources in embodiments of the invention as compared to conventional processes in which value needs to be deducted from a sender's account before a gift card or other device is provided to a recipient. Embodiments also improve upon conventional systems such as conventional gift card systems, since actual accounts to hold funds need not be created. Further, compared to conventional systems, a separate gift card infrastructure need not be built and maintained.

As noted above, although the examples above are described in the context of the use of a payment token as a way to provide a gift card from a first user to a second user, embodiments can be used in other contexts. For example, when accessing data or a secure location, the payment token could alternatively be an access token. Also, instead of restrictions on the use of a payment token (e.g., for a certain dollar amount), restrictions in a non-payment context such as secure location access might be restrictions on the time, day, and specific location at which access is granted. Access may be granted by a first user to a second user to a specific building, at a specific location and at a specific time and date. An access token may be generated at the request of the first user, and then provided to the specific building (i.e., resource provider in this example). Once the second user is notified that the access token is present at the specific building or resource provider, the second user may use the access token to access the building.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   authenticating, by an authorizing entity computer, a first user operating a first communication device, in response to the first user interacting with the authorizing entity computer via the first communication device;
   receiving, by the authorizing entity computer, a request from the first communication device, the request corresponding to obtaining a token to be used by a second user operating a second communication device, wherein the first communication device is different than the second communication device, and the first and second user are different;
   transmitting, by the authorizing entity computer, a token request message to a processing server computer responsive to receiving the request from the first communication device;
   receiving, by the processing server computer, the token request message from the authorizing entity computer;
   obtaining, by the processing server computer, the token in response to receiving the token request message;
   transmitting, by the processing server computer, the token to a resource provider computer;
   storing, by the resource provider computer, the token;
   providing, by the resource provider computer, a notification message to the second communication device operated by the second user, the notification message indicating that the token is stored in the resource provider computer;
   receiving, by the resource provider computer, a response to the notification;
   transmitting, by the resource provider computer, an authorization request message comprising the token for a transaction conducted by the second user to the processing server computer, after the second user interacts with the resource provider computer;

receiving, by the processing server computer, the authorization request message comprising the token;

initiating, by the processing server computer, detokenizing the token to a real credential; and transmitting, by the processing server computer, a modified authorization request including the real credential to the authorizing entity computer for authorization of the transaction conducted by the second user via the second communication device.

2. The method of claim 1, wherein the token is an access token, and wherein the method further comprises:

receiving an authorization response message from the authorizing entity computer.

3. The method of claim 1, wherein the authorization request message is received by the processing server computer from the resource provider computer.

4. The method of claim 3, wherein the resource provider computer allows access to secure data or a secure location.

5. The method of claim 1, wherein obtaining the token comprises requesting, by the processing server computer, the token from a token service computer, and receiving, by the processing server computer, the token.

6. The method of claim 1, wherein the token request message comprises an identifier for the second communication device.

7. The method of claim 1, further comprising:

obtaining, by the processing server computer, a token cryptogram in response to receiving the token request message; and transmitting the token cryptogram to the resource provider computer.

8. A system comprising:

an authorizing entity computer;

a processing server computer; and a resource provider computer, each of which comprises a hardware processor, and a non-transitory computer readable medium coupled to the hardware processor, the non-transitory computer readable medium comprising code, executable by the hardware processor, to implement a method comprising:

authenticating, by the authorizing entity computer, a first user operating a first communication device, in response to the first user interacting with the authorizing entity computer via the first communication device;

receiving, by the authorizing entity computer, a request from the first communication device, the request corresponding to obtaining a token to be used by a second user operating a second communication device, wherein the first communication device is different than the second communication device, and the first and second user are different;

transmitting, by the authorizing entity computer, a token request message to a processing server computer responsive to receiving the request from the first communication device;

receiving, by the processing server computer, the token request message from the authorizing entity computer;

obtaining, by the processing server computer, the token in response to receiving the token request message;

transmitting, by the processing server computer, the token to the resource provider computer;

storing, by the resource provider computer, the token;

providing, by the resource provider computer, a notification message to the second communication device operated by the second user, the notification message indicating that the token is stored in the resource provider computer;

receiving, by the resource provider computer, a response to the notification;

transmitting, by the resource provider computer, an authorization request message comprising the token for a transaction conducted by the second user to the processing server computer, after the second user interacts with the resource provider computer;

receiving, by the processing server computer, the authorization request message comprising the token;

initiating, by the processing server computer, detokenizing the token to a real credential; and transmitting, by the processing server computer, a modified authorization request including the real credential to the authorizing entity computer for authorization of the transaction conducted by the second user via the second communication device.

9. The system of claim 8, wherein in the method the authorization request message is received by the processing server computer from the resource provider computer.

10. The system of claim 9, wherein in the method the resource provider computer allows access to secure data or a secure location.

11. The system of claim 8, wherein in the method, obtaining the token comprises requesting, by the processing server computer, the token from a token service computer, and receiving, by the processing server computer, the token.

12. The system of claim 8, wherein in the method the token request message comprises an identifier for the second communication device.

* * * * *